(12) United States Patent
Kashiwabara et al.

(10) Patent No.: US 11,170,635 B2
(45) Date of Patent: Nov. 9, 2021

(54) AUTOMATIC INSPECTION SYSTEM, INSPECTION TARGET READING DEVICE FOR AUTOMATIC INSPECTION SYSTEM, AND CONTROL METHOD FOR AUTOMATIC INSPECTION SYSTEM

(71) Applicant: Hitachi, Ltd., Tokyo (JP)

(72) Inventors: Hiroshige Kashiwabara, Tokyo (JP); Takuma Nishimura, Tokyo (JP); Yoshimi Fujimata, Tokyo (JP); Hidemasa Nakai, Tokyo (JP); Jumpei Honda, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 481 days.

(21) Appl. No.: 16/319,500

(22) PCT Filed: Jun. 7, 2017

(86) PCT No.: PCT/JP2017/021116
§ 371 (c)(1),
(2) Date: Jan. 22, 2019

(87) PCT Pub. No.: WO2018/061326
PCT Pub. Date: Apr. 5, 2018

(65) Prior Publication Data
US 2021/0287527 A1   Sep. 16, 2021

(30) Foreign Application Priority Data
Sep. 30, 2016 (JP) .............................. JP2016-192457

(51) Int. Cl.
*G08C 17/02* (2006.01)
*H04Q 9/00* (2006.01)
*H04W 24/04* (2009.01)

(52) U.S. Cl.
CPC ............... *G08C 17/02* (2013.01); *H04Q 9/00* (2013.01); *H04W 24/04* (2013.01)

(58) Field of Classification Search
None
See application file for complete search history.

(56) References Cited

U.S. PATENT DOCUMENTS 6,748,341 B2 * 6/2004 Crowder, Jr. ...... G05B 23/0254
702/181
7,277,823 B2 * 10/2007 Harrison .................. G06N 3/02
702/183

(Continued)

FOREIGN PATENT DOCUMENTS

JP          7-198331 A     8/1995
JP       2009-140184 A    6/2009

(Continued)

OTHER PUBLICATIONS

International Search Report (PCT/ISA/210) issued in PCT Application No. PCT/JP2017/021116 dated Aug. 29, 2017 with English translation (three pages).

(Continued)

*Primary Examiner* — Adolf Dsouza
(74) *Attorney, Agent, or Firm* — Crowell & Moring LLP (57) ABSTRACT

A reading device includes wireless slave devices that communicate via a multihop wireless network, a measuring unit that measures the state of an inspection target to generate measurement data, a measurement data analysis unit, and a failure cause analysis unit that analyzes a failure cause when the analysis of the failure cause analysis unit fails. The reading device transmits the measurement data to the data collecting device by associating the measurement data with failure cause information. The data collecting device includes a wireless master device, a measurement data acquisition unit that acquires measurement data from each (Continued)

reading device, a recording unit that records the measurement data when the measurement data is not associated with failure cause information, and a retry control unit that retries data acquisition according to the type of the failure cause when the measurement data is associated with the failure cause information.

10 Claims, 6 Drawing Sheets

(56) References Cited

U.S. PATENT DOCUMENTS

| | | | |
|---|---|---|---|
| 7,328,128 B2* | 2/2008 | Bonanni | G05B 23/0251 |
| | | | 702/182 |
| 8,521,443 B2* | 8/2013 | Vichare | G06F 11/008 |
| | | | 702/34 |
| 2013/0027219 A1 | 1/2013 | Myoung et al. | |

FOREIGN PATENT DOCUMENTS

| | | |
|---|---|---|
| JP | 2009-282627 A | 12/2009 |
| JP | 2011-82672 A | 4/2011 |

OTHER PUBLICATIONS

Japanese-language Written Opinion (PCT/ISA/237) issued in PCT Application No. PCT/JP2017/021116 dated Aug. 29, 2017 (three pages).

* cited by examiner

AUTOMATIC INSPECTION SYSTEM, INSPECTION TARGET READING DEVICE FOR AUTOMATIC INSPECTION SYSTEM, AND CONTROL METHOD FOR AUTOMATIC INSPECTION SYSTEM

TECHNICAL FIELD

The present invention relates to an automatic inspection system, an inspection target reading device for an automatic inspection system, and a control method for an automatic inspection system.

BACKGROUND ART

Usually, meters, such as flowmeters or wattmeters, are inspected by workers who visually check the meters several times to more than ten times a day. In contrast, a system for automatically reading a value of the meter using a television camera is known (PTL 1). Another known technique in the wireless meter reading system is a technique of preventing the increase of communication time in which, when communication between the portable wireless device and the wireless slave device fails, a failure cause is classified and determined and the communication is retried by batch communication for each classification (PTL 2).

CITATION LIST

Patent Literature

PTL 1: JP H07-198331 A
PTL 2: JP 2009-282627 A

SUMMARY OF INVENTION

Technical Problem

PTL 1 merely discloses a technique for reading a meter value with a camera. PTL 2 merely discloses a technique for collecting meter reading values by wireless communication. Furthermore, both prior art techniques enable direct communication between transmitter and receiver, and do not allow transmission of measurement data via multihop wireless network.

In a case where a wireless master device and a plurality of wireless slave devices transmit data via the multihop wireless network, it is useless to transfer data measured by a slave device sequentially, if the measurement is failed, toward the master unit. In addition to the useless data transfer, the slave device participating in the data transfer wastefully exhausts power and decreases its battery life.

It is possible to retry reading the measurement data to the slave device that has failed the measurement. However, retrying the data transfer without knowing the cause of the measurement failure (not the cause of the communication failure) would repeat unnecessary measurement and unnecessary communication at the plurality of slave devices, possibly consume batteries of the slave devices.

The present invention has been made in view of the above problem, and it is an object of the present invention to provide an automatic inspection system that prevents unnecessary retries of data transfer and contributes to power saving at the time of inspection, an inspection target reading device for an automatic inspection system, and a method of controlling the inspection system.

Solution to Problem

In order to solve the above problem, an automatic inspection system according to an embodiment of the present invention includes a plurality of inspection target reading devices connected by a wireless network, and a data collecting device that collects data from the plurality of inspection target reading devices, in which each inspection target reading device includes a wireless slave device that communicates with the data collecting device or another inspection target reading devices through a multihop wireless network, a measuring unit that measures a state of the inspection target and generates measurement data, a measurement data analysis unit for analyzing the measurement data, and a failure cause analysis unit for analyzing the failure cause when the analysis by the measurement data analysis unit fails, the measurement data is associated with failure cause information indicating the failure cause and transmitted to the data collecting device through the multihop wireless network, and the data collecting device includes a wireless master device that communicates with each of the inspection target reading devices via the multihop wireless network, a measurement data acquisition unit that acquires measurement data from each inspection target reading device via the wireless master device, a recording unit that records the acquired measurement data when the failure cause information is not associated with the acquired measurement data, and a retry control unit that retries, when the acquired measurement data is associated with the failure cause information, data acquisition according to a type of the failure cause for a predetermined inspection target reading device corresponding to the failure cause information among the inspection target reading devices.

Advantageous Effects of Invention

According to the embodiment of the present invention, the data acquisition can be retried according to the type of failure cause to a predetermined inspection target reading device corresponding to the failure cause information among the respective inspection target reading devices. Therefore, useless retry for the data acquisition is decreased and power saving is achieved.

DESCRIPTION OF EMBODIMENTS

The embodiment of the present invention will be described below by referring to the accompanying drawings. In the present embodiment, an automatic inspection system using a multihop sensor wireless network retries measurement stepwise according to the measurement failure cause when failed due to surrounding environment.

The wireless master device enables communication by hopping a plurality of wireless slave devices (transferring by reception and transmission of unit packet), when communicating with end slave devices using the multihop wireless network. Preferably, therefore, communication with end slave devices having a high hop count is performed less frequently to decrease power consumption of the wireless slave devices.

Meanwhile, when the meter value is read using the camera, a situation in which an appropriate image is not taken due to the surrounding environment, such as dew condensation or rain, would occur. In this case, it is necessary to read the meter value again and transfer the meter value to the wireless master device, but the wireless slave devices involved in this retry consume electric power for data transfer.

For example, if the retry is instructed by the wireless master device to the end slave device immediately after the meter value reading fails at the wireless slave device having a high hop count, a new multihop communication starts in forward and rearward directions by involving wireless slave devices that operate as relay devices. This causes an increase of power consumption in the entire multihop wireless network. However, there is no guarantee for the success of the retry and wasteful exhaustion of the batteries of the wireless slave devices may only be resulted.

If, for example, it is difficult to read the meter value due to dew condensation, such a state may not be solved immediately. Responding immediately to such a meter with the dew condensation would result in useless multihop communication and wastefully exhausting batteries of the wireless slave devices involved in the multihop communication functioning as relay devices.

Meanwhile, the wireless slave devices are normally put in a power-saving sleep state, and activated only at the time of data transfer and meter value reading. Accordingly, when useless retries are made, the time during which the wireless slave devices are in the sleep state is shortened and the power consumption increases.

Therefore, the present embodiment achieves a power saving and highly reliable automatic inspection system by executing stepwise retries in accordance with the failure cause of the measurement in the environment condition where the reading of the sensor data (e.g., meter reading) is difficult.

In the present embodiment, as will be described later, reading devices 1 including wireless slave devices 10 respond to a data collecting device 2 including a wireless master device 20, when the reading of the meter value has failed, by including a cause (e.g., presence or absence of water droplets due to dew condensation or raindrops) in the response.

The data collecting device 2 analyzes the response status from all the reading devices 1 and retries stepwise according to the analysis result. Failure causes include time-solving failure causes that can be solved spontaneously over time, such as condensation, rain, light insertion or object shadow, and other causes of failure. Therefore, in the present embodiment, the reading device 1 requiring low power consumption for retrying is used as a determination target device subjected to determination as to whether the failure cause has been solved. When the retry at the determination target device succeeds, a retry to another reading device 1 that has failed during the first reading is performed.

For example, when there are a plurality of reading devices 1 that have failed to read the meter value due to water droplets adhering to the meter, the data collecting device 2 retries the reading devices 1 having the smallest hop count among the failed reading devices 1 one by one in a round-robin system. If this retry is successful, the data collecting device 2 then retries the next reading devices 1 having the second smallest hop count among the failed reading devices 1 one by one in the round-robin system. Similarly, the data collecting device 2 performs retries in hierarchical order from the smaller hop count.

When the first retry is successful, the data collecting device 2 may retry the remaining all failed reading devices 1 collectively.

At this time, the cycle of retry may be set according to the failure cause. For example, when the meter value is difficult to read due to adhesion of raindrops or dew condensation, it is possible to determine the cycle of retry according to, e.g., a temperature and weather, or the elapsed time after the first measurement. When the temperature rises, for example, the retry interval is made shorter than the normal set value, or when the air temperature does not rise too much, the retry interval can be made longer than the normal set value. Further, for example, an illuminometer is used to estimate whether the weather has recovered and, if the weather is presumably recovered, the retry interval is set to be shorter than the normal set value, while if the weather is presumably not recovered, the retry interval can be made longer than the normal set value.

First Embodiment

Embodiments will be described with reference to FIGS. 1 to 7. In the present embodiment, a wattmeter is described as an example of an inspection target. However, the present invention is not limited to the wattmeter, and can also be applied to the case of reading the condition of the inspection target, such as an ammeter, a flowmeter, a pressure gauge, a thermometer, or the like.

Figure 1:
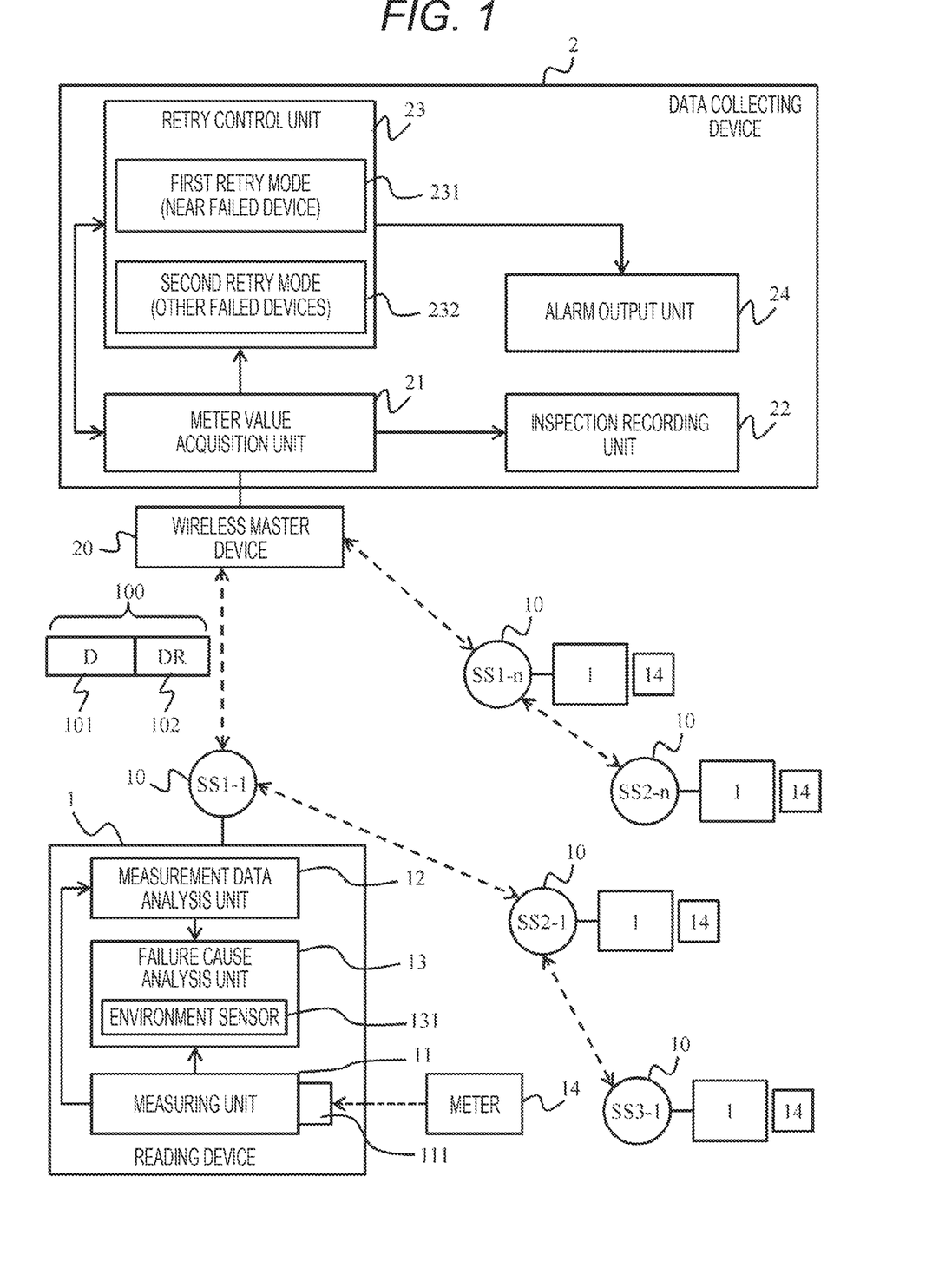
FIG. 1 is an overall view of an automatic inspection system.

The automatic inspection system includes, for example, a plurality of reading devices 1 and a data collecting device 2. The reading devices 1 functioning as "inspection target reading devices" are distributed, for example, by following a distribution system not illustrated and are connected to neighboring nodes (the reading device 1 or the data collecting device 2) via a multihop wireless network.

The reading devices 1 are each configured as an electronic circuit device having hardware resources including, for example, a microprocessor, a memory, an input/output unit, and a battery (none of which are illustrated herein). To utilize these hardware resources, each reading device 1 includes, as hardware utilizing functions, a measuring unit 11, a measurement data analysis unit 12, and a failure cause analysis unit 13.

Further, each reading device 1 includes a wireless slave device 10. The wireless slave device 10 may be formed separately from the reading device 1 and electrically connected to the reading device 1, or may be provided inside the reading device 1.

The wireless slave device 10 is connected to other wireless slave devices 10 or the data collecting device 2 via the multihop wireless network, and transfers a packet in a so-called bucket brigade manner. The data size of the packet is as small as several kilobytes. Preferably, the packet size should be as small as possible, because the data collecting device 2 needs to regularly collect data from a plurality of (usually a large number of) wireless slave devices 10. Upon receiving a data transmission request from the data collecting device 2, the wireless slave device 10 starts the reading device 1 from the sleep state and causes the reading device 1 to read the meter value. After transmitting the data including the meter value read by the reading device 1 to the data collecting device 2, the wireless slave device 10 shifts the reading device 1 to the sleep state.

The measuring unit 11 photographs a meter 14 with a camera 111 to read the meter value, and outputs image data as "measurement data".

The measurement data analysis unit 12 receives the image data from the measuring unit 11 and processes the image data to read the meter value.

When the measurement data analysis unit 12 fails to read the meter value, the failure cause analysis unit 13 analyzes the failure cause. The failure cause analysis unit 13 can estimate what has caused the failure of reading the meter value in accordance with a comparison result between the image data by which the reading of the meter value is failed and a known failure pattern, and information of surrounding environment detected by an environment sensor 131. Examples of the environment sensor 131 include a temperature sensor, a humidity sensor, an atmospheric pressure sensor, an illuminance sensor, and an object detection sensor. The environment sensor 131 may include at least one of these sensors. Alternatively, at least one sensor included in the environment sensor 131 may be used together with the camera 111 used in the measuring unit 11. For example, a camera may be combined with an infrared type object detection sensor, or a camera and an illuminance sensor may be combined.

The failure cause classification by the failure cause analysis unit 13 can be roughly divided into those having a high possibility that the cause is resolved over time and those having a low possibility of resolving the cause even after a lapse of time. Details thereof will be described later with reference to FIG. 4.

The reading device 1 reads the meter value of the meter 14 in response to a request from the data collecting device 2 and sends measurement data 100 indicating the reading result from the wireless slave device 10 to the multihop wireless network. The measurement data 100 includes a read meter value 101 and success/failure information 102. The success/failure information 102 is information indicating the success or failure of the reading of the meter value, and includes a code for specifying the failure cause if reading fails. The failure cause code for identifying this failure cause corresponds to "failure cause information".

As an example of the success/failure information 102, "0" is set in the case of success. The failure cause code is set in the success/failure information 102, such as "1" in case of failure due to rain or dew condensation, "2" in case of failure due to light or shadow, and "3" in case of foreign object adhesion.

A large number of reading devices 1 participate in the multihop wireless network at a relatively low communication speed and transmit a large number of packets at a frequency of, for example, several times to more than ten times a day. Therefore, it is necessary to reduce the packet size to the smallest possible size. The present embodiment, therefore, analyzes the failure cause inside the reading device 1. If the measurement data 100 is generated by associating the failure cause code 102 with the reading result 101 of the meter value, it is possible to reduce the packet size flowing through the multihop wireless network.

As described above, the data collecting device 2 collects and manages data regularly or irregularly from each reading device 1 connected via the multihop wireless network. For this purpose, the data collecting device 2 includes the wireless master device 20.

The data collecting device 2 is configured as a computer or a dedicated electronic circuit device including, for example, hardware resources such as a microprocessor, a memory, an auxiliary storage device, an input/output portion (none of these are not illustrated herein), and software resources such as an operating system and a computer program. By using these hardware resources and software resources, the data collecting device 2 realizes functions such as a meter value acquisition unit 21, an inspection recording unit 22, a retry control unit 23, and an alarm output unit 24.

The meter value acquisition unit 21 is an example of the "measurement data acquisition unit". The meter value acquisition unit 21 regularly or irregularly acquires measurement data from all or a part of the reading devices 1 which are under control of the data collecting device 2.

The inspection recording unit 22 is an example of a "recording unit". The inspection recording unit 22 only records the measurement data that can be normally read out of the measurement data (meter value) collected by the meter value acquisition unit 21.

When the failure cause code 102 is associated with the measurement data 100 collected from the reading device 1, the retry control unit 23 instructs the reading device 1 (a predetermined inspection target reading device) that has failed in reading, to retry data acquisition according to the type of the failure cause.

The retry control unit 23 has a plurality of retry modes 231 and 232 to cope with a predetermined failure cause. The first retry mode 231 is a mode for checking as to whether the failure cause has been solved with the smallest possible power consumption. For example, the first retry mode retries, for the data acquisition, the reading device 1 including the wireless slave device 10 with the small hop count from the wireless master device 20 among the reading devices 1 that have failed to read the meter value. Since the hop count is small, it is possible to reduce power consumption of the entire system required for retrying the data acquisition. The first retry mode 231 may also be referred to as, for example, a survey mode.

The second retry mode 232 is a retry mode executed when the data acquisition by the first retry mode 231 has succeeded. The second retry mode 232 retries, for the data acquisition, all or a part of the reading devices 2 that are not subject to retry by the first retry mode 231 among the reading devices 1 that have failed to read the meter value.

An example of the case where a communication distance (hop count) between the reading device 1 and the data collecting device 2 is classified into three ranks: H1 (hop count=1), H2 (hop count=2), and H3 (hop count=3) will be described herein. First, the data collecting device 2 causes the reading device 1 belonging to the H1 layer among the reading devices 1 that have failed to retry data acquisition.

When retrying in the hierarchy H1 succeeds, the data collecting device 2 retries data acquisition for all the remaining reading devices 1 out of the reading devices 1 that have failed in reading. That is, the data collecting device 2 causes all the reading devices 2 that have failed in reading and belong to the H2 and H3 layers to retry the data acquisition.

Alternatively, the data collecting device 2 may retry data acquisition for the reading device 1 that has failed to read and belongs to that layer in order from the layer with the short communication distance. In other words, the data collecting device 2 retries data acquisition for the layer H1 first, retries the data acquisition for the layer H2 when the retry of the layer H1 succeeds, and upon successful retry of the layer H2, acquires data for the layer H3. That is, in this method, the first retry mode 231 is executed in order of the communication distance hierarchy layers.

The alarm output unit 24 outputs an alarm to the user (e.g., operator) of the data collecting device 2 when the failure cause that cannot be handled by retry by the retry control unit 23 occurs. For example, the alarm output unit 24 outputs a message, such as "Failure code A is generated in reading device B. Please send worker to worksite." to the user via means such as speech synthesis, by displaying on the display unit, an e-mail, or the like.

Figure 2:
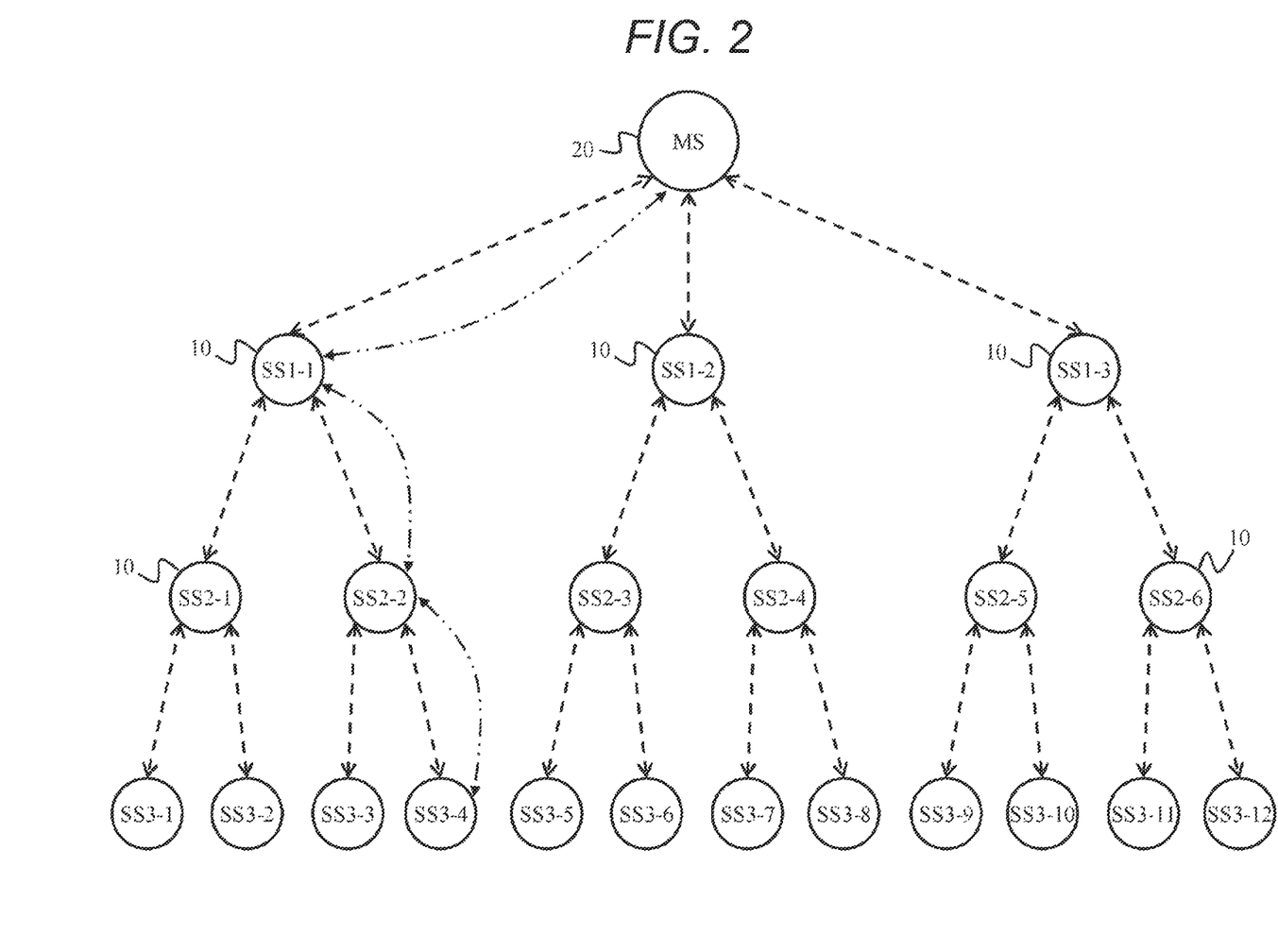
FIG. 2 is an explanatory diagram of a multihop wireless network.

FIG. 2 illustrates an overview of the multihop wireless network. In the drawing, the wireless master device is indicated as "MS" and the wireless slave device is indicated as "SS". In addition, a code corresponding to the communication distance hierarchy is added to the wireless slave device 10. For example, "SS1-1" indicates the first wireless slave device among the wireless slave devices belonging to the layer of hop count 1 in the hierarchy. The first and second indicate the administrative order. Similarly, "SS2-3" indicates the third wireless slave device among the wireless slave devices belonging to the layer of hop count 2 in the hierarchy.

When the wireless master device 20 communicates with the wireless slave device 10 of the end layer, the intermediate wireless slave devices function as relay devices. For example, as indicated by a two-dot chain line in FIG. 2, when the wireless master device 20 communicates with the wireless slave device "SS3-4", the intermediate wireless slave device "SS1-1" and "SS2-2" on the multihop wireless network function as relay devices. Thus, as described above, when the wireless master device communicates with the end wireless slave device, the wireless slave devices located on the way to the opponent end wireless slave device is also activated in addition to the opponent device.

Figure 3:
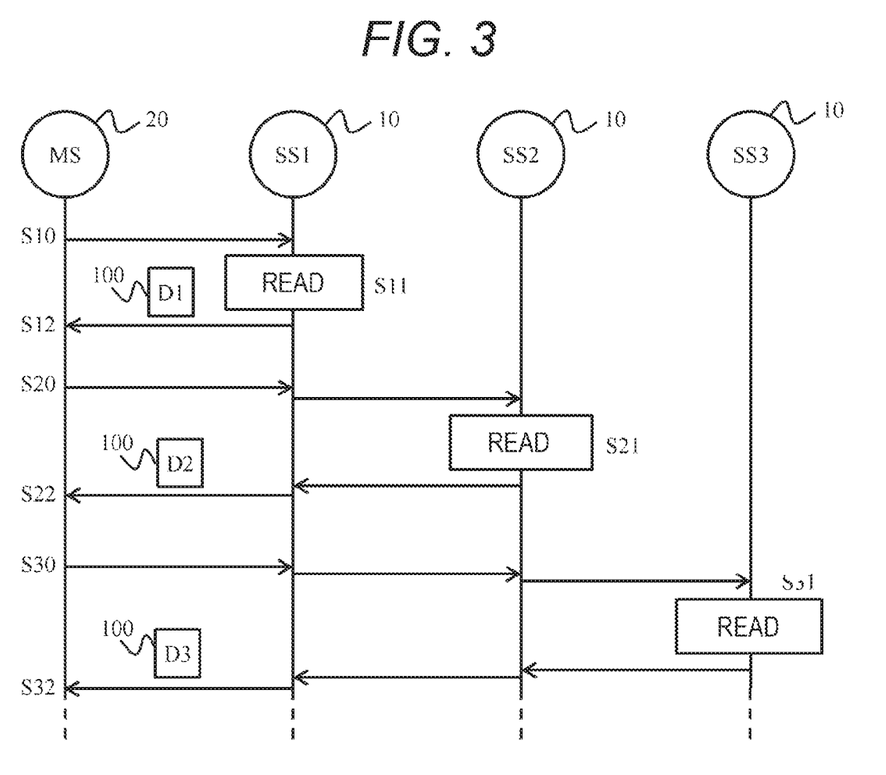
FIG. 3 is a sequence diagram illustrating how the master device collects data from the slave devices using a multihop wireless network.

FIG. 3 is a sequence diagram illustrating how the data collecting device 2 collects reading results (measurement data) of meter values from each reading device 1 using the multihop wireless network. In the drawing, the wireless slave devices 10 of the reading devices 1 are illustrated instead of the reading devices 1, and the wireless master device 20 is illustrated instead of the data collecting device 2. Assume that, to distinguish the reading devices 10, the reading device 10 with hop count=1 is referred to as "reading device 1(SS1)", the reading device 1 with hop count=2 as "reading device 1(SS2)", the reading device 1 with hop count=3 is referred to as "reading device 1(SS3)".

To acquire measurement data from the reading device 1(SS1), the data collecting device 2 requests data transmission from the reading device 1(SS1) (S10). Upon receiving the data transmission request from the data collecting device 2, the wireless slave device 10(SS1) of the reading device 1(SS1) activates the reading device 1(SS1).

Upon activation of the reading device 1(SS1), the camera 111 photographs the meter 14 and reads the meter value (S11). The reading device 1(SS1) determines whether the meter value is normally read, generates measurement data 100, and transmits the measurement data 100 to the data collecting device 2 (S12). If it is determined that the reading device 1(SS1) has failed to read the meter value because of the raindrops or the like attached to the meter 14, the failure cause code 102 is added to the measurement data 100.

The wireless slave device 10(SS1) of the reading device 1(SS1) transmits the measurement data 100 to the data collecting device 2 and, then, shifts the reading device 1(SS1) to the sleep state.

Similarly, when acquiring the measurement data 100 from the reading device 1(SS2), the data collecting device 2 requests data transmission to the reading device 1(SS2) (S20). This data transmission request reaches the wireless slave device 10(SS2) via the wireless slave device 10(SS1) that comes to serve as a relay device.

Upon receiving the data transmission request, the wireless slave device 10(SS2) activates the reading device 1(SS2). The reading device 1(SS2) reads the meter value of the meter 14 to generate measurement data 100 (S21), and sends the measurement data 100 from the wireless slave device 10(SS2) to the data collecting device 2 (S22). The measurement data 100 of the reading device 1(SS2) is sent to the data collecting device 2 via the wireless slave device 10(SS1) that functions as the relay device.

The data collecting device 2 acquires the measurement data 100 from the end reading device 1(SS3) is the same manner as above (S30 to S32). Since the reading device 1(SS3) is farthest from the data collecting device 2, there are many wireless slave devices 10 functioning as relay devices (two in the case of FIG. 3). In collecting data using the multihop wireless network in this way, the retry for the end reading device 1(SS3) consumes batteries of the wireless slave devices 10 functioning as the relay devices. Therefore, it is preferable to decrease unnecessary retries.

Figure 4:
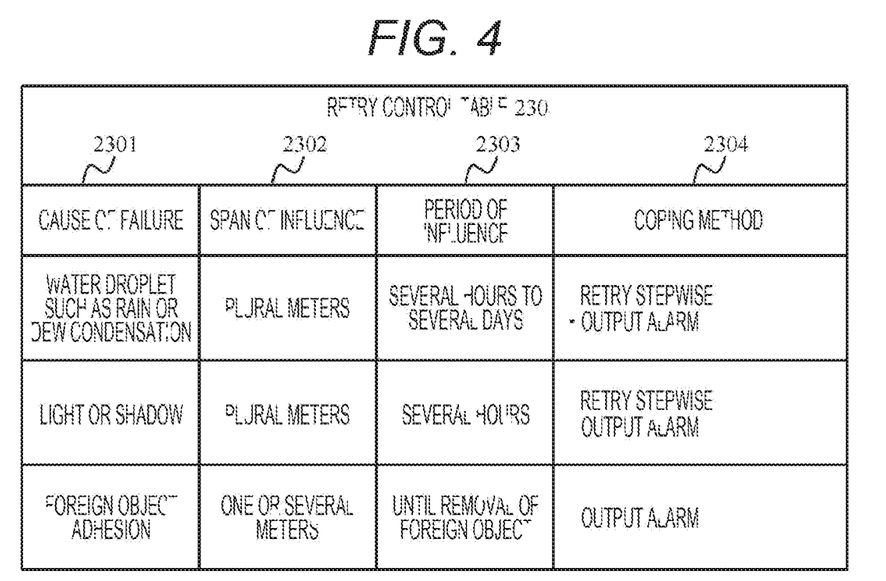
FIG. 4 is an example of a table for retry control according to failure causes of measurement.

FIG. 4 illustrates an example of a retry control table 230. The retry control table 230 is used by the retry control unit 23 of the data collecting device 2.

For example, the retry control table 230 controls items such as a failure cause 2301, a span of influence 2302, a period of influence 2303, and a coping method 2304. Items other than those illustrated in the drawing may further be included.

Failure cause 2301 is an item indicating the reason why the reading of the meter value by the reading device 1 has failed. The failure cause 2301 is associated with the value of the failure cause code 102. Examples of the failure cause include water droplets such as rain or dew condensation, light or shadow, and foreign object adhesion.

The span of influence 2302 indicates the span of the meters (the span of the reading devices 1 that monitor the meter) affected by the individual failure cause illustrated in the failure cause 2301. The span of influence 2302 includes, for example, the case of affecting a plurality of meters 14 (when the influence is wide), and the case of affecting one or several meters 14 (when the influence is limited).

The period of influence 2303 indicates the time range in which the failure cause indicated in the failure cause 2301 affects the measurement. As the period of influence 2303, the influence may continue until the cause is removed in the case of several hours to several days (long time) or in several hours (short time).

The coping method 2304 indicates how to cope with the failure cause. The retrying method includes, for example, stepwise retry and alarm output. The stepwise retry refers to retrying the reading device 1 belonging to the layer of hierarchy having the smallest hop count and, if the retry succeeds, retry another reading device 1 belonging to the layer of hierarchy having the second smallest hop count or the reading devices 1 belonging to all other layers of hierarchy.

Figure 5A:
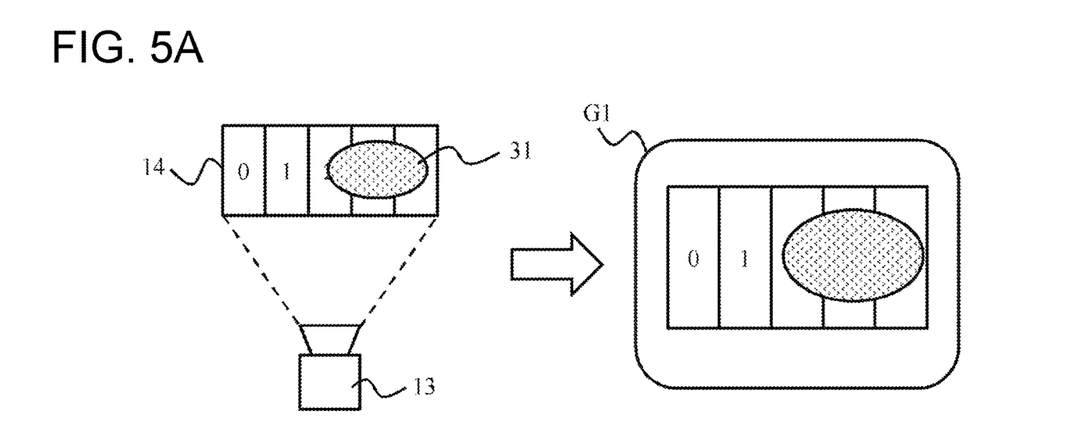
FIGS. 5A to 5C are explanatory diagrams illustrating classified measurement failure causes.

FIG. 5 illustrates examples of the reading result of the meter value for each failure cause. As illustrated in FIG. 5A, when a water droplet 31 of rain or dew condensation is the failure cause 2301, at least part of the meter value becomes less readable due to the water droplet (G1). Usually, however, the water droplet 31 probably disappears over time depending on the weather condition. For example, the dew condensation disappears when the temperature rises, and the raindrops eventually evaporate and disappears as the weather becomes fair. However, in the rainy season, such as Tsuyu in Japan, there is a possibility that poor reading of the meter value due to water droplets may continue for several days. As the coping method 2304 in this case, stepwise retry and alarm output are set. Alarm is output if it is determined that it takes more time than the predetermined value before the water droplet disappears. If it is determined that the water droplet disappears in a time shorter than the predetermined value, stepwise retry needs to be performed.

Figure 5B:
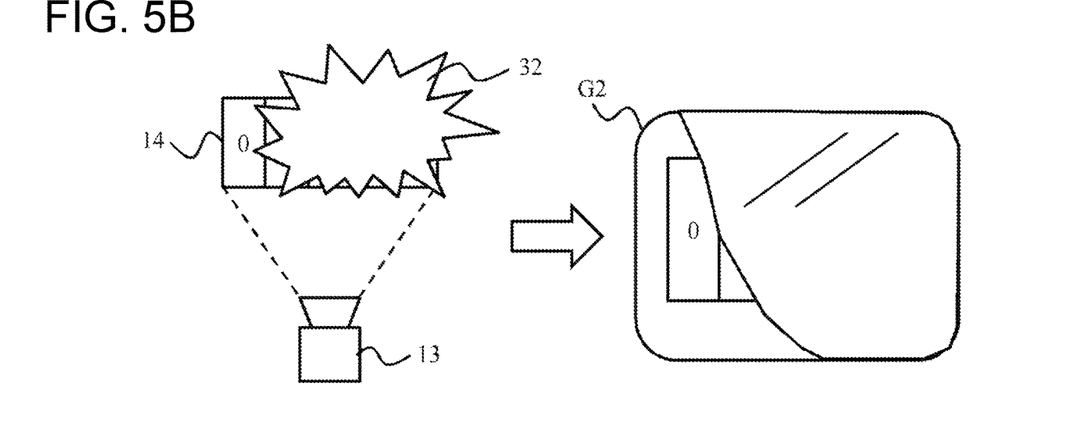

As illustrated in FIG. 5B, the cause of light or shadow among the failure causes 2301 is that light 32 reflected by an object such as a vehicle or the like is inserted into the meter 14 and deteriorates the read image, or the shadow of the object such as a vehicle covers the meter 14 and deteriorates the read image (G2). The cause of light or shadow is possibly solved in relatively short time. On the other hand, if a tree near the meter 14 collapses and the meter 14 falls into the shadow of the tree, it may take time until the cause is removed. As the coping method 2304 in this case, stepwise retry and alarm output are set.

Figure 5C:
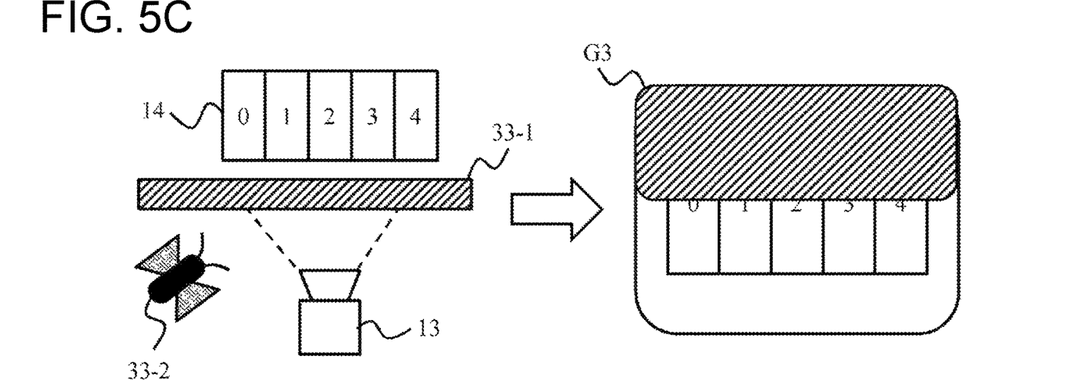

As illustrated in FIG. 5C, among the failure causes 2301, the foreign object adhesion is such that a foreign object 33 such as ab insect, dust, fallen leaves, etc. has adhered to the meter 14 or the camera 111. FIG. 5C illustrates a fixed foreign object 33-1, such as tree branches or dust, and a mobile foreign object 33-2, such as a living insect, separately.

In this case, at least a part of the image obtained by photographing the meter value is covered with the foreign object 33, and the meter value cannot be accurately read (G3). If the foreign object 33 is the cause, there is a high possibility that the meter value cannot be normally read until the operator removes the foreign object 33. As the coping method 2304 in this case, the alarm output is set.

The failure causes and the coping methods are not limited to the above examples. In short, the present embodiment controls the retry method of data acquisition according to the classification result of the failure cause.

Figure 6:
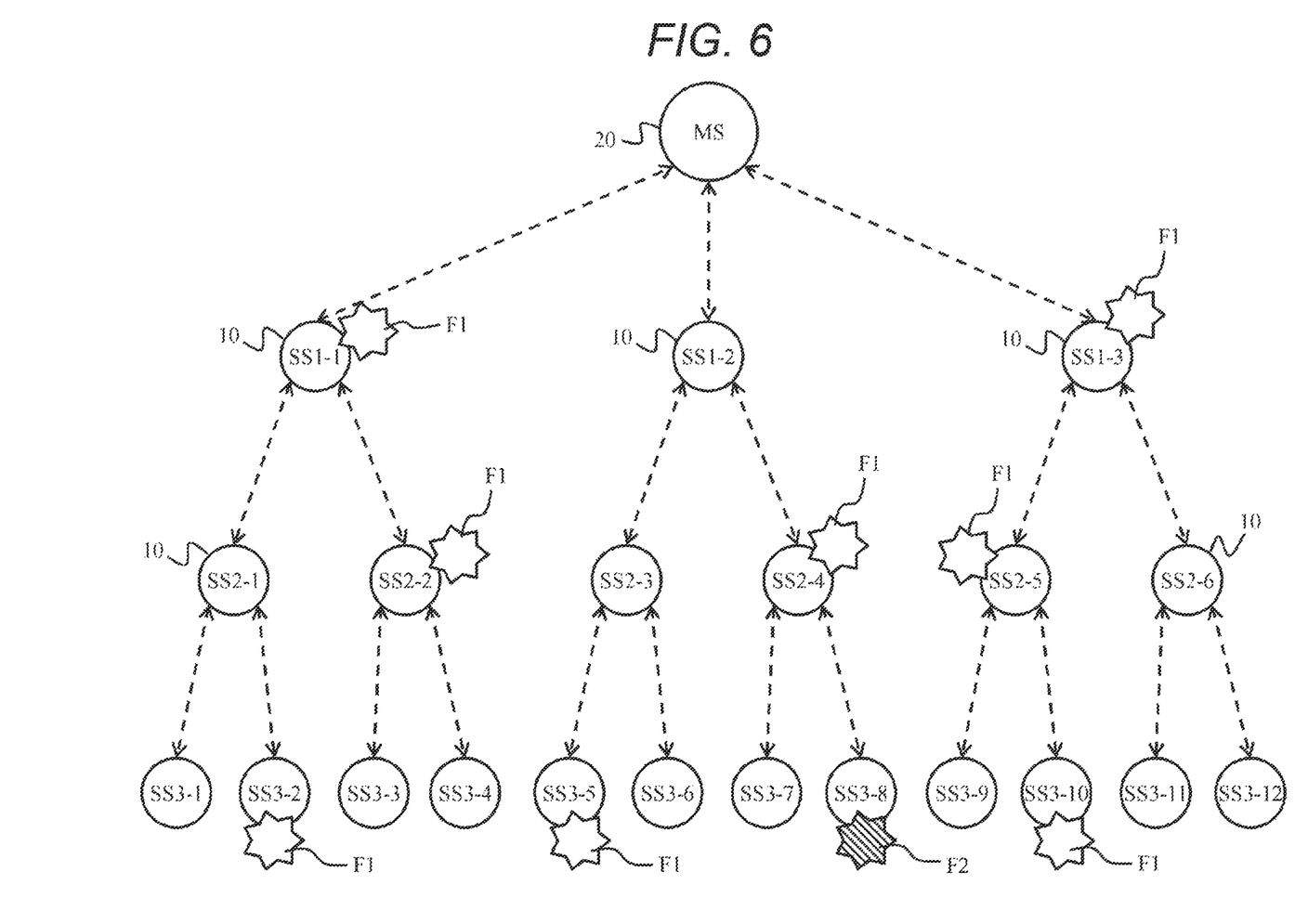
FIG. 6 is an explanatory diagram illustrating how a retry is performed for data acquisition.

FIG. 6 schematically illustrates how the stepwise retry is performed. Similarly to FIG. 3, the wireless slave devices 10 of the reading devices 1 are illustrated instead of the reading devices 1 and the wireless master device 20 is illustrated instead of the data collecting device 2.

The multihop wireless network illustrated in FIG. 6 includes three layers of hierarchy: a layer of hop count=1, a layer of hop count=2, and a layer of hop count=3. Among the reading devices 1 constituting this multihop wireless network, some reading devices 1 have failed to read the meter value. Either mark F1 or F2 indicating the failure cause is put on the reading devices 1 that have failed in reading. Here, code F1 is attached to a time-solving type cause that is solved over time, and code F2 is attached to other causes. In the following description, the reading device 1 that has failed to read the meter value may be abbreviated as the read failure device 1 in some cases.

The retry control unit 23 of the data collecting device 2 retries the data acquisition for the read failure devices 1(SS1-1) and 1(SS1-3) that are present in the closest layer. In the case of retrying a plurality of read failure devices 1 of the same layer, a round-robin system, for example, may be used.

When the retry has succeeded for all of the read failure devices 1 in the first layer, the data collecting device 2 retries data acquisition from the read failure devices 1(SS2-2), 1(SS2-4), and 1(SS2-5) in the second layer. In this case, the round-robin system can also be used to perform retries in turn.

When the retry has succeeded for all of the read failure devices 1 in the second layer, the data collecting device 2 retries data acquisition from the read failure devices 1(SS3-2), 1(SS3-5), 1(SS3-10) in the third layer. In this case, the round-robin system can also be used. The read failure device 1(SS3-8) on which the cause F2 that is not the time-solving type failure cause has occurred is not subject to retry. This is because such a retry results in wasteful power consumption.

As described above, the data collecting device 2 can retry data acquisition for the read failure device 1 for each layer according to the hop count. Alternatively, after the retry at the closest first layer is successful, the data collecting device 2 may retry all of the read failure devices 1 in all other layers collectively. That is, when data acquisition is successfully performed at the read failure devices 1(SS1-1) and 1(SS1-3), it is regarded that the failure cause F1 has been resolved also in other reading failing device 1, and other reading devices 1(SS2-2), 1(SS2-4), 1(SS2-5), 1(SS3-2), 1(SS3-5), and 1(SS3-10) may be retried collectively.

Figure 7:
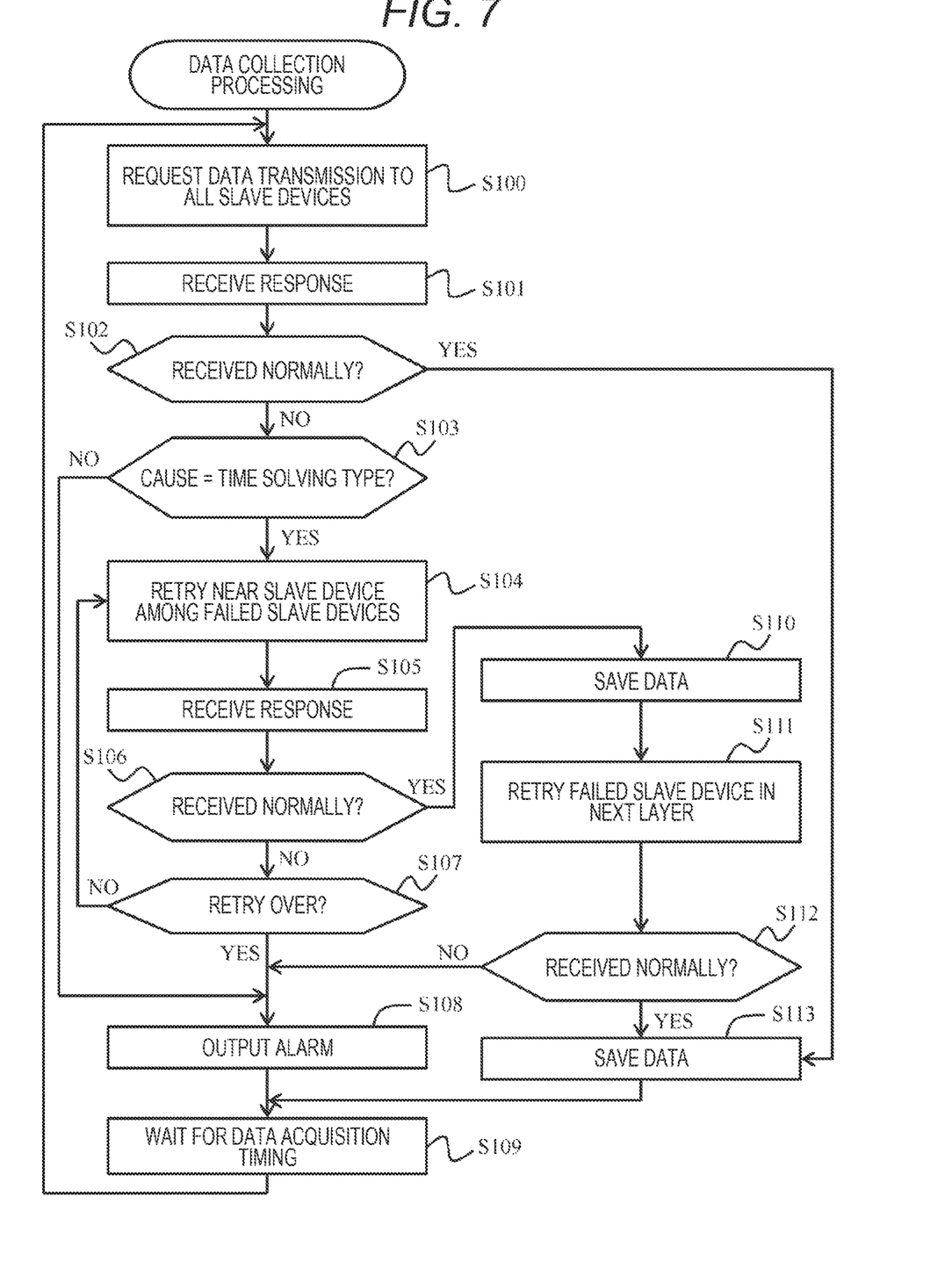
FIG. 7 is a flowchart of data collection processing.

FIG. 7 is a flowchart illustrating data collection processing. The meter value acquisition unit 21 of the data collecting device 2 requests data transmission to all the wireless slave devices 10 (S100). As described above, upon receiving the data transmission request, each wireless slave device 10 activates the reading device 1 and causes the camera 111 to read the meter value. Then, the wireless slave device 10 transmits the measurement data 100 generated by the reading device 1 to the data collecting device 2.

The meter value acquisition unit 21 receives the measurement data 100 from each wireless slave device 10 via the multihop wireless network (S101). The meter value acquisition unit 21 determines whether all the received measurement data 100 are normal (S102). If it is determined that all the measurement data 100 are normal (S102: YES), the meter value acquisition unit 21 transmits the measurement data 100 to the inspection recording unit 22 for storage (S113).

When the meter value acquisition unit 21 determines that some of the measurement data 100 in the measurement data 100 received in step S101 has failed (S102: NO), the retry control unit 23 analyzes the failure cause code 102 included in the failed measurement data 100 and determines whether the failure cause is the time-solving type cause (S103). Examples of the time-solving type failure cause include, as described in FIG. 4, water droplets, such as rain or dew condensation, and light or shadow.

If the retry control unit 23 determines that the failure cause is the time-solving type failure cause (S103: YES), the retry control unit 23 retries the data acquisition in the round-robin system for the read failure devices 1 belonging to the nearest layer (S104).

Upon receiving the measurement data 100 from the read failure device 1 (S105), the meter value acquisition unit 21 determines whether the measurement data 100 is normal (S106). If the measurement data 100 obtained by the retries is not normal and includes the failure cause code 102 (S106: NO), the retry control unit 23 determines whether the retry has been performed for at least predetermined times (S107). If the preset number of retries has not been reached (S107: NO), the process returns to step S104 after waiting for a predetermined time, and the data acquisition is retried again for the read failure devices 1 located in the nearest layer.

Meanwhile, if the measurement data 100 received as a result of the retries for the read failure devices 1 located in the nearest layer is normal (S106: YES), the meter value acquisition unit 21 sends the measurement data 100 to the inspection recording unit 22 for storage (S110).

The retry control unit 23 retries data acquisition for the read failure device 1 belonging to the second nearest layer (S111). When it is determined that the measurement data 100 obtained by retrying is normal (S112: YES), the meter value acquisition unit 21 transmits the measurement data 100 to the inspection recording unit 22 for storage (S113). Here, retrying in stepwise over two layers is described.

When the retries to the read failure devices 1 located in the nearest layer has reached the preset number of retries (S107: YES), or the retries of read failure devices 1 located in the second nearest layer have failed (S112: NO), the retry control unit 23 causes the alarm output unit 24 to output an alarm (S108). The user who receives the alarm arranges work or the like for maintenance of the read failure devices 1.

When the acquisition of the meter value is completed in this manner, the meter value acquisition unit 21 waits for the next data acquisition timing (S109). In the case where the measurement data 100 obtained as a result of retrying the read failure devices 1 in the second nearest layer is normal and stored in the inspection recording unit 22, the next data acquisition timing is also waited. The data collecting device 2 collects and stores the measurement data from each reading device 1 at a frequency of several to more than ten times a day.

FIG. 7 illustrates the hierarchy of two layers divided according to the distance (hop count) from the wireless master device 20, but it is also possible to divide the reading devices that belong to the multihop wireless network into three or more layers, as described by referring to FIGS. 2, 3, and 6.

Then, the data collecting device 2 can retry the read failure devices 1 of each layer in order from the smaller number of hop count. Alternatively, the retry of the read failure device 1 located in the nearest layer is regarded as a search retry for checking whether the failure cause has been solved and, if the search retry is successful, all the remaining read failure devices 1 may be retried.

According to the present embodiment configured as described above, the following effects are obtained. In the automatic inspection system using the multihop wireless network, the present embodiment allows retries according to the failure cause. As a result, in the present embodiment, the data is obtained from the reading devices 1, while the power consumption is decreased as much as possible, so that both power saving and high reliability can be achieved simultaneously.

It should be noted that the present invention is not limited to the above-described embodiment. Those skilled in the art can make various additions and modifications within the scope of the present invention. In the above-described embodiment, the present invention is not limited to the configuration example illustrated in the accompanying drawings. It is possible to appropriately change the constitution and processing method of the embodiment within the scope of achieving the object of the present invention.

In addition, each constituent element of the present invention can arbitrarily be selected and sorted, and the invention having a configuration which is selected and sorted is also included in the present invention. Furthermore, the configurations described in the appended claims can be combined with any combination besides those specified in the claims.

REFERENCE SIGNS LIST

1 reading device
2 data collecting device
10 wireless slave device
11 measuring unit
12 measurement data analysis unit
13 failure cause analysis unit
14 meter
20 wireless master device
21 meter value acquisition unit
22 inspection recording unit
23 retry control unit
24 alarm output unit

The invention claimed is:

1. An automatic inspection system, comprising:
   a plurality of inspection target reading devices connected by a wireless network; and
   a data collecting device that collects data from the plurality of inspection target reading devices, wherein
   each of the inspection target reading devices include
   a wireless slave device that communicates with the data collecting device or another inspection target reading device through a multihop wireless network,
   a measuring unit that measures a state of the inspection target and generates measurement data,
   a measurement data analysis unit that analyzes the measurement data, and
   a failure cause analysis unit that analyzes a failure cause when the analysis by the measurement data analysis unit fails,
   the measurement data is associated with failure cause information indicating the failure cause and transmitted to the data collecting device through the multihop wireless network, and
   the data collecting device includes
   a wireless master device that communicates with each of the inspection target reading devices through the multihop wireless network,
   a measurement data acquisition unit that acquires measurement data from each of the inspection target reading devices through the wireless master device,
   a recording unit that records the acquired measurement data when the failure cause information is not associated with the acquired measurement data, and
   a retry control unit that retries, when the acquired measurement data is associated with the failure cause information, data acquisition according to a type of the failure cause for a predetermined inspection target reading device corresponding to the failure cause information among the inspection target reading devices.

2. The automatic inspection system according to claim 1, wherein
   when it is determined that the failure cause is a time-solving type failure cause that is solved over time, the retry control unit retries data acquisition from the predetermined inspection target reading device corresponding to a layer of a hop count on the way to the wireless master device.

3. The automatic inspection system according to claim 2, wherein
the retry control unit retries the data acquisition from the predetermined inspection target reading device in order from the layer having the smallest hop count to a layer having the largest hop count.

4. The automatic inspection system according to claim 3, wherein
when the data acquisition from the predetermined inspection target reading device that belongs to a layer having the hop count succeeds, the retry control unit retries the data acquisition from the predetermined inspection target reading device that belongs to a layer having a larger number of hop count.

5. The automatic inspection system according to claim 2, wherein
when the data acquisition from the predetermined inspection target reading device that belongs to the layer having the smallest number of hop count, the retry control unit retries the data acquisition from the remaining predetermined inspection target reading devices.

6. The automatic inspection system according to claim 1, wherein
the failure cause analysis unit includes an environment detection unit that detects surrounding environment of the measuring unit and the inspection target.

7. The automatic inspection system according to claim 2, wherein
the retry control unit outputs an alarm when it is determined that the failure cause is not the time-solving type failure cause.

8. The automatic inspection system according to claim 1, wherein
the wireless slave device causes the measuring unit to generate the measurement data when receiving a data transmission request from the data collecting device through the multihop wireless network, and
the wireless slave device stops the measuring unit after transmitting the measurement data to the data collecting device through the multihop wireless network.

9. An inspection target reading device for an automatic inspection system, the inspection target reading device used in the automatic inspection system and transmitting data to a data collecting device through a multihop wireless network, comprising:
a wireless slave device that communicates with the data collecting device or another inspection target reading device through the multihop wireless network;
a measuring unit that measures a state of the inspection target and generates measurement data;
a measurement data analysis unit that analyzes the measurement data; and
a failure cause analysis unit that analyzes a failure cause when the analysis by the measurement data analysis unit fails, wherein
the inspection target reading device transmits the measurement data and the failure cause information indicating the analyzed failure cause, from the wireless slave device through the multihop wireless network, to the data collecting device that is configured to retry data acquisition according to a type of the failure cause.

10. A control method for an automatic inspection system including a plurality of inspection target reading devices connected by a wireless network and a data collecting device that collects data from the plurality of inspection target reading devices, comprising:
by each of the inspection target reading devices,
measuring a state of the inspection target and generating measurement data;
analyzing the measurement data; and
analyzing a failure cause when the analysis by the measurement data analysis unit fails; and
associating the measurement data with failure cause information and transmitting the measurement data from the wireless slave device to the data collecting device through the multihop wireless network, and
by the data collecting device,
acquiring the measurement data from the each of the inspection target reading device from the wireless master device through the multihop wireless network;
when the acquired measurement data is not associated with the failure cause information, recording the acquired data; and
when the acquired measurement data is associated with the failure cause information, retrying the data acquisition according to a type of the failure cause for a predetermined inspection target reading device corresponding to the failure cause information among the inspection target reading devices.

* * * * *